United States Patent
Bala et al.

(10) Patent No.: US 7,956,867 B2
(45) Date of Patent: Jun. 7, 2011

(54) COLOR SEPARATION MULTIPLEXING FOR REAL-TIME MULTI-DIMENSIONAL DEVICE CALIBRATION

(75) Inventors: Raja Bala, Webster, NY (US); Vishal Monga, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 635 days.

(21) Appl. No.: 12/118,306

(22) Filed: May 9, 2008

(65) Prior Publication Data
US 2009/0279111 A1    Nov. 12, 2009

(51) Int. Cl.
| | |
|---|---|
| G09G 5/00 | (2006.01) |
| G09G 5/02 | (2006.01) |
| H04N 1/50 | (2006.01) |
| H04N 5/46 | (2006.01) |
| H04N 5/14 | (2006.01) |
| H04N 1/46 | (2006.01) |
| G06K 9/00 | (2006.01) |
| G03F 3/08 | (2006.01) |
| H04N 5/202 | (2006.01) |
| G06F 15/00 | (2006.01) |
| G06K 9/36 | (2006.01) |
| G06K 9/32 | (2006.01) |

(52) U.S. Cl. ........ 345/589; 345/600; 345/606; 345/694; 345/643; 348/254; 348/557; 348/671; 358/1.1; 358/515; 358/518; 358/525; 382/166; 382/232; 382/276; 382/300

(58) Field of Classification Search .......... 345/418–419, 345/581, 589–593, 586, 643, 600–606, 549, 345/565, 690, 567; 348/253–254, 557, 671; 358/1.1, 1.9, 504, 515, 518–519, 523, 525; 382/162–166, 254, 274, 232, 248, 276, 300
See application file for complete search history.

(56) References Cited

U.S. PATENT DOCUMENTS

| | | | | |
|---|---|---|---|---|
| 5,067,019 | A * | 11/1991 | Juday et al. | 348/580 |
| 5,296,935 | A * | 3/1994 | Bresler | 358/406 |
| 5,305,119 | A | 4/1994 | Rolleston | |
| 5,528,386 | A | 6/1996 | Rolleston | |
| 5,615,282 | A * | 3/1997 | Spiegel et al. | 382/167 |
| 6,416,154 | B1 * | 7/2002 | Silverbrook | 347/19 |
| 6,729,546 | B2 * | 5/2004 | Roustaei | 235/462.45 |
| 2004/0257595 | A1 | 12/2004 | Sharma et al. | |
| 2006/0286360 | A1 * | 12/2006 | Rhine et al. | 428/221 |
| 2010/0289835 | A1 * | 11/2010 | Holub | 345/690 |

OTHER PUBLICATIONS

U.S. Appl. No. 11/716,283, filed Mar. 9, 2007 by Vishal Monga et al.
R. Bala, Device Characterization Digital Color Imaging Handbook, Chapter 5, CRC Press, 2003.

* cited by examiner

*Primary Examiner* — Wesner Sajous
(74) *Attorney, Agent, or Firm* — Fay Sharpe LLP

(57) ABSTRACT

In accordance with the disclosure, a method is provided for processing color images for rendering on a color image. The method comprises receiving a plurality of device color separations for an image intended for rendering on a color image device; forming at least one intermediate image by interleaving pixels from at least two of the device color separations, compressing the at least one intermediate image in a compression module; decompressing the at least one intermediate image in a decompression module; processing the at least one decompressed intermediate image through a multidimensional calibration transform to output a calibrated device color separation; and, the device color separations include at least three colors.

21 Claims, 9 Drawing Sheets

COLOR SEPARATION MULTIPLEXING FOR REAL-TIME MULTI-DIMENSIONAL DEVICE CALIBRATION

CROSS REFERENCE TO RELATED PATENTS AND APPLICATIONS

U.S. patent application Ser. No. 10/465,408, "Two-dimensional calibration architectures for color devices" to Sharma et al.

"Device Calibration Method with Accurate Planar Control". Ser. No. 11/716,283 to V. Monga and R. Bala.

BACKGROUND

In modern business, economic, and scientific environments, color has become essential as a component of communication. Color facilitates the sharing of knowledge and ideas. Companies involved in the development of digital color document output devices are continuously searching for techniques, which can improve the accuracy and total image quality of their products.

Color images are commonly represented as one or more separations, each separation comprising a set of color density signals for a single primary color. Color density signals are commonly represented as digital pixels, which vary in magnitude from a minimum to a maximum, with a number of gradients corresponding to the bit density of the system. Thus, for example, a common 8-bit system can provide 256 shades of each primary color.

A color can therefore be considered as the combination of magnitudes of each pixel, which when viewed together present the combination color. Usually, printer signals include three subtractive primary color signals (i.e., Cyan (C), Magenta (M) and Yellow (Y)). Often a fourth Black (K) signal is also employed. Together, these primaries can be considered the printer colorant signals. Each color signal forms a separation, and when combined together with the other separations forms the color image.

It is desirable to specify document properties in a device-independent fashion in order to facilitate the exchange and reuse of documents where possible. Colors are therefore preferably specified in a device-independent color space based on the characteristics of human vision. In order to print or display a given color, it is often necessary to determine device control values corresponding to specified device-independent color values, because the native control spaces of output devices (e.g., a printer's CMYK values) do not constitute device-independent color spaces. This normally can be accomplished utilizing a three-step procedure.

First, a set of color patches with pre-determined device control values is output on the device and the color of each patch is measured in device-independent color coordinates. Second, utilizing the device control values and the corresponding measured device-independent color values, a "forward device-response function" can be estimated. Third, the "forward device-response function" can be "inverted" to obtain a "device-correction-function".

The "forward device-response function" of step two represents the mapping from device control values to the device independent color values produced by the device in response to the control values. The "device-correction-function" of step three maps each device-independent color to the device control values that produce the specified device-independent color value on the output device. The "device-correction-function" is typically pre-computed and stored in memory. In order to produce a given color on the output device, the corresponding device-independent color values are mapped through the "device correction-function" to obtain control values. When the device is driven with such control values, a desired color can be produced.

It is common practice to separate the "device correction-function" into two parts: a "calibration" function that immediately precedes the device and a "characterization" function, which addresses the device "through" the calibration function. This separation is illustrated in FIG. 1 for the case of a conventional CMYK printer. In FIG. 1, a conventional system 100 is depicted, which can be implemented as a CMYK printer. System 100 can be divided into a "device-correction function" 105 and a "calibrated device" portion 107. The "device correction function" 105 can be partitioned into characterization and calibration portions, respectively represented by a characterization routine 102 and a calibration unit 104.

A device independent color can be provided as input 110 to the characterization routine 102, whose output can be fed to a calibration unit 104. The output from calibration unit 104 can be provided in turn to an output device 106 as indicated by an output line 114. Additionally, line 112 indicates alternate CMYK (i.e., fast emulation). Data can be output from a reprint path unit 108 and fed to the calibration unit 104. In FIG. 1, the "calibration device" portion 107 of system 100 can be formed generally from calibration unit 104 and output device 106.

Another example of a device correction system includes U.S. Pat. No. 5,305,119 to Rolleston et al, "Color Printer Calibration Architecture," which issued on Apr. 19, 1994 and is assigned to Xerox Corporation. U.S. Pat. No. 5,305,119 is generally directed toward a method of characterizing and calibrating a response of a printer to an image described in terms of colorimetric values. A further example of a device correction method and system is described in U.S. Pat. No. 5,528,386 to Rolleston et al, "Color Printer Calibration Architecture," which issued on Jun. 18, 1996 and is also assigned to Xerox Corporation. U.S. Pat. No. 5,528,386 generally describes a conventional one-dimensional architecture for the calibration step. Both U.S. Pat. Nos. 5,305,119 and 5,528,386 are incorporated herein by reference.

BRIEF DESCRIPTION

Aspects of the present disclosure relate to methods and systems for processing color images for rendering on a color device are disclosed herein. A pre-determined transformation can be applied to a plurality of uncalibrated control variables input to a color output device in order to obtain a plurality of intermediate variables.

In accordance with the disclosure, a method is provided for processing color images for rendering on a color image. The method comprises receiving a plurality of device color separations for an image intended for rendering on a color image device; forming at least one intermediate image by interleaving pixels from at least two of the device color separations, compressing the at least one intermediate image in a compression module; decompressing the at least one intermediate image in a decompression module; processing the at least one decompressed intermediate image through a multidimensional calibration transform to output a calibrated device color separation; and, the device color separations include at least three colors.

In accordance with the disclosure, a method is provided for controlling a color output device. The method comprises receiving a plurality of device color separations for an image intended for rendering on a color image device, wherein the device color separations include a first, second, and third color; forming at least one intermediate image by interleaving pixels from at least two of the device color separations, wherein the at least one intermediate image is formed by interleaving the first color, treated as the primary component, with functions of the second and the third colors, treated as a first secondary component; compressing the at least one intermediate image in a compression module; decompressing the at least one intermediate image in a decompression module; and, processing the at least one decompressed intermediate image through a multidimensional calibration transform to output a calibrated device color separation.

In accordance with the disclosure, a method is provided for processing a color image. The method comprises receiving a plurality of device color separations for an image intended for rendering on a color image device; forming at least one intermediate image by interleaving pixels from at least two of the device color separations; compressing the at least one intermediate image in a compression module; decompressing the at least one intermediate image in a decompression module; processing the at least one decompressed intermediate image through a multidimensional calibration transform to output a calibrated device color separation, wherein the device color separations include a first, second, and third color. The method further provides a first intermediate image formed by interleaving the first color, treated as the primary component, with a sum of the second and the third colors, treated as a first secondary component; a second intermediate image is formed by interleaving the second color, treated as the primary component, with a sum of the first and the third colors, treated as a second secondary component; and, a third intermediate image is formed by interleaving the third color, treated as the primary component, with a sum of the first and the second colors, treated as a third secondary component.

BRIEF DESCRIPTION OF THE DRAWINGS

The accompanying figures, in which like reference numerals refer to identical or functionally-similar elements throughout the separate views and which are incorporated in and form part of the specification further illustrate embodiments of the present disclosure.

DETAILED DESCRIPTION

Figure 1:
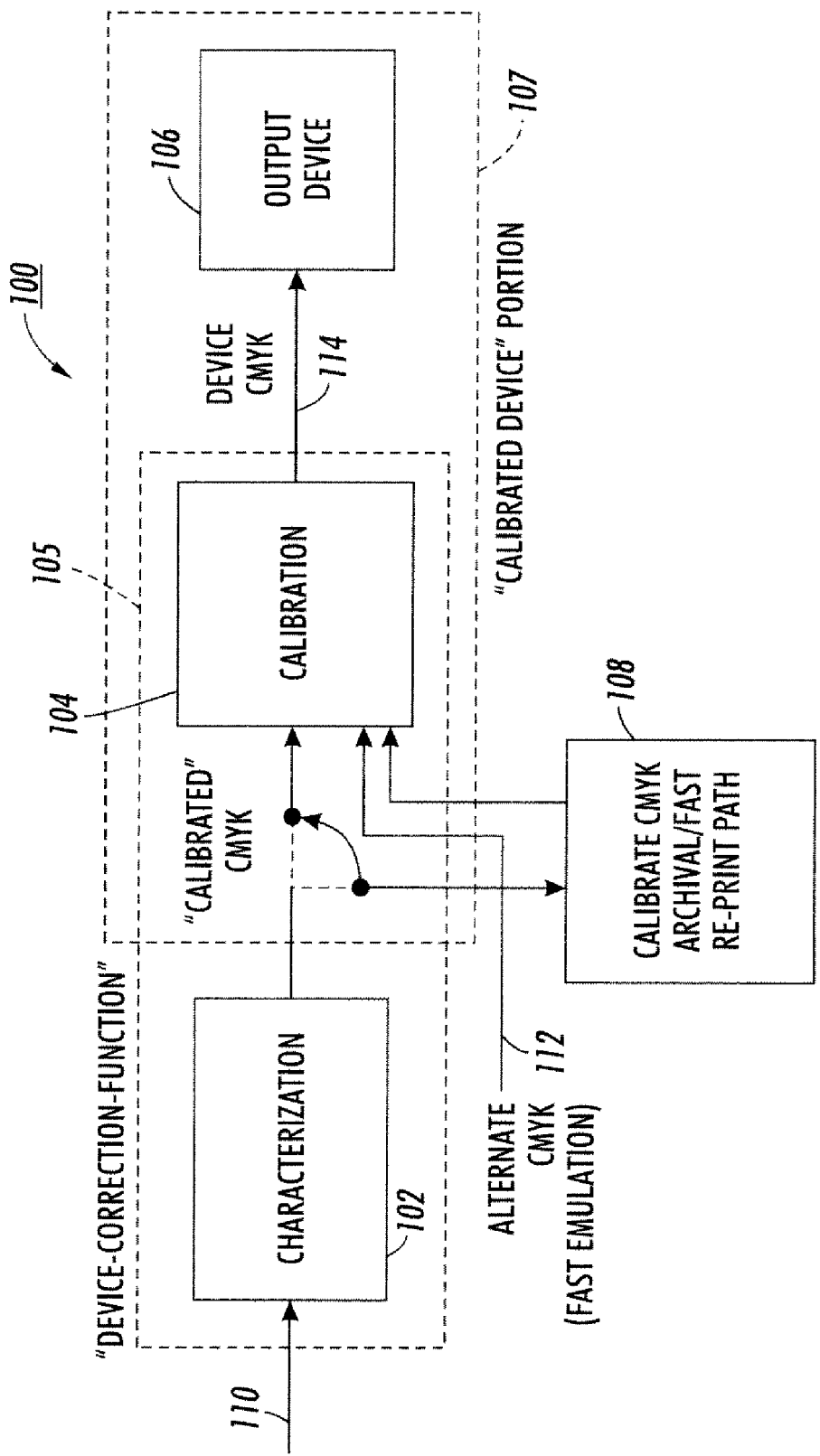
FIG. 1 illustrates a conventional system, which partitions "device-correction function" into characterization and calibration.

Color calibration is a part of most color management systems. Color calibration applies correction functions to the device channels to compensate for device color drift and differences in response across different devices. Standard printer calibration can be done via one-dimensional (1-D) tone reproduction curves (TRCs) applied to each of C, M, Y, K (Cyan, Magenta, Yellow, and Black). This channel-wise approach is very restrictive in the control that can be exercised over the device gamut. A typical example is that 1-D TRCs in a printer can be used to either ensure gray balance along the C=M=Y axis or to provide a linear response along each of the C, M, Y, K axis, but not both. Recently, higher dimensional, in particular two-dimensional (2-D) calibration transforms have been developed that enable significantly greater control over the device gamut. Many hardware architectures however, are not amenable to realizing multi-dimensional transforms and are designed specifically for sequential processing of color planes one at a time. A scheme is therefore desired that can allow multi-dimensional transforms to be realized for sequential processing of color planes one at a time.

The embodiments, to be described hereinafter, are generally related to the field of color image/text printing and display systems; for example, methods and systems for processing a multi-separation image through a calibration function or transformation, i.e. processing a single separation at a time.

One of the aspects of a "calibration transformation" is to facilitate a trade-off. Unlike the "full device-correction function," calibration transformation provides control of the output device in a limited and exclusive fashion. In comparison to the full device-correction function, however, the calibration transformation also offers significant advantages in that it requires substantially reduced measurement effort and also a substantially lower computational effort. The lower computational effort requirement allows it to be incorporated in high-speed real-time printing, image-processing chains for which the full device-correction function may be too computational and/or memory intensive. For color output devices, particularly those utilized in the printing arts, calibration can be performed for the Black (K) channel independently and for the Cyan (C), Magenta (M), and Yellow (Y) channels either independently or together.

As an illustrative example, the case of a 3-channel (CMY) printer can be considered. An aspect of calibration is to determine a calibration transform from CMY to C'M'Y' that maintains a desired printer response in selected regions of color space. Additionally, the calibration transform is derived to be computationally efficient with a small memory requirement so that it can be incorporated in high-speed real-time printing paths.

Traditionally, the calibration transform has been applied in the form of one-dimensional correction to the individual channels for the device. For CMY, the calibration can be applied as tone reproduction curves (TRCs) for each of the C, M, and Y channels.

With traditional one-dimensional calibration, either a one-dimensional desired response can be specified along each of the three primary axes, e.g. linearization to delta-E from paper, or a three-dimensional CIELAB response can be specified along a one-dimensional locus that satisfies certain monotonicity constraints. The transformation in the rest of CMY space is therefore generally an outcome of the calibration function over which no control is available. Note that CIELAB (full name is CIE 1976 L*, a*, b*) is used extensively throughout the color management workflow from creation to prepress to press. Software applications, such as Photoshop and QuarkXPress, use CIELAB. Color management via ICC profiles also uses CIELAB as one of the interchange spaces. CIELAB can be used to measure color on all the different media used today—not only color from film, plates and press sheets, but also from inkjet proofs and LCD and CRT computer monitors.

For example, all input points with the same input C value (e.g., M vs. Y plane) can map to the same C' value. The problem with such an approach is that the response in a large part of color space potentially can be compromised to obtain a desired response along a one-dimensional locus. For example, if the TRCs are gray balanced, this can sometimes result in undesirable hue shifts in the reproductions of sweeps from white to secondary device colors (e.g., those lying along the red axis where M=Y, and C=K=0, likewise for green and blue). Conversely, if the TRCs are independently linearized, this will generally not yield gray balance for C=M=Y.

One of The primary advantages with TRCs is that they are very efficient for real-time image processing. Memory requirements are also very minor: for 8-bit processing, 256 bytes of memory would be necessary for each separation's TRC for a total of 768 bytes of storage. Additionally, derivation of the calibration is generally a simple, well-understood process, which involves measuring step wedges of pure C, M, Y and possibly patches near C=M=Y if gray balance is desired.

As an alternative to control of each individual channel for calibration, calibration may be performed as a full three-dimensional function from input C, M, Y to output C', M', Y'. Such a process has traditionally been utilized for characterization in current color management architectures but can be applied to calibration as an option, three-dimensional (3-D) calibration offers, in principle, full control within the entire color gamut of the printer.

If sparse three-dimensional look-up tables (LUTs) are used with interpolation, however, the processing may become too computationally intensive for high speed printing applications. A full resolution LUT with direct lookup avoids interpolation, but might be prohibitively large, especially if several LUTs are used for different media, halftones, etc. For 8 bit processing, for instance, a full three-dimensional LUT would require $3*(256)^3$ bytes=48 MB of storage. Derivation of the calibration is similar to characterization, due to arbitrary three-dimensional control. Typically this can involve a large number of measurements.

The two alternatives of TRCs and 3-D calibration transforms pose two extremes in cost-vs-quality tradeoff. TRCs are appealing because of simplicity in derivation and processing. TRCs, however, are restrictive in the amount of control over the printer response. Three-dimensional LUTs offer tremendous control, but derivation and image processing are generally much more complex.

The particular values and configurations discussed hereinafter in the following non-limiting examples can be varied and are cited merely to illustrate embodiments of the present disclosure and are not intended to limit the scope of the disclosure.

The present disclosure is generally directed toward the utilization of calibration architectures for color devices that employ a dimensionality greater than one. Examples are two-dimensional (2-D) and three-dimensional (3-D) calibration transforms. The 2-D and 3-D calibration methods and systems described herein enable significantly more control than traditional one-dimensional calibration, while memory and computational requirements thereof are quite reasonable. The disclosure described herein can be readily embodied in real time image paths for high speed printing applications.

Throughout the description indicated herein, several definitions can consistently apply. The term "input control values" refers generally to values that are input to the calibration transform described herein. The term "output control values" refers to values that are output from the calibration transform and that directly drive the device. Additionally, the term "intermediate control values" can refer to intermediate variables computed from the input control variables in the process of computing output variables.

The present disclosure can also enable control of multiple aspects of the device characteristics. For example, one embodiment of the method and system described herein allows independent control of the device behavior along the individual C, M, and Y axes and along the device gray axis (C=M=Y, K=0) and along a secondary color, for instance a device-blue axis (C=M, Y=K=0). The additional control ability afforded by the present disclosure can be particularly useful in non-conventional imaging devices that are often used to emulate the characteristics for other devices.

This disclosure proposes combining information from multiple device color separations (e.g. CMYK) into a single channel. One aspect of the disclosure is to realize multi-dimensional calibration in a hardware architecture that is inherently capable of processing only a single channel at a time. In one embodiment, a 2-D calibration can be employed where the indices into the 2-D LUT are C vs. M+Y for the Cyan LUT 200, and analogously M vs. C+Y, and Y vs. C+M for the Magenta and Yellow 2-D LUTs 210, 220, respectively (refer to FIG. 2). An intermediate image can be created for each color channel to be calibrated. As an example, for the Cyan channel, a process step can synthesize an M+Y image by simply performing a pixel-wise addition of the corresponding M and Y values, and spatially interleave the C and M+Y image into a single intermediate image. Analogous intermediate images can be created for M and Y channels. The interleaving can be pixel/scanline/block interleaving. Additionally, to meet storage bandwidth/memory constraints, downsampling the M+Y, C+Y and C+M channels can be accomplished. This is justified by the fact that the calibration transform for Cyan has a stronger dependence on input Cyan and only a secondary dependence on M+Y. Similarly, the M and Y calibration transforms have a stronger dependence on input M and Y, respectively, and only a secondary dependence on C+Y and C+M, respectively. The downsampling step can be done spatially and/or tonally. The intermediate images can be further compressed using any standard compression module, e.g. Xerox multi-mode compression technology (XM2); see U.S. Pat. No. 7,003,585 to Phung et al. assigned to Xerox Corporation, which is incorporated by reference in its entirety. Compression technology provides ways to improve printer performance by using similar technology available from the television and cable industry. The compression technology enables machines to assemble and print color documents at a high speed. One of the challenges overcome with compression technology is the ability to handle tens of millions of pixels, i.e. selecting, processing and positioning each pixel with precision.

XM2 is a system that compresses both the personalized images and the assembled page to a manageable size and runs imaging and compression algorithms on a high-performance video chip. The combination of XM2 and the video chip can deliver the same high-quality images using one-third the bandwidth that industry-standard compression algorithms use, wherein the result provides the ability to move files that contain more data in a smaller format, ultimately boosting print speeds. This type of compression is advantageous when printing variable content documents, which may include a combination of pictures, text, and graphics. See for example U.S. Pat. No. 7,003,585 to Phong et al., assigned to Xerox Corporation, which is incorporated by reference in its entirety.

In the real-time printing (or re-printing) process of the present disclosure, each compressed intermediate image can be decompressed, and suitably processed one at a time via the 2-D calibration transform to obtain corrected C, M and Y images ready for printing.

The concept has been simulated by realizing a 2-D calibration transform via the methods proposed in this disclosure. It is shown that the spatial and tonal downsampling factors can be chosen appropriately so that the proposed realization of the 2-D transform still closely matches the full-resolution 2-D transform while still meeting real-time processing constraints. It is readily workable via the multiplexing operations that precede the calibration and the intermediate images that are archived prior to (re)-printing.

Recall that the disclosure is motivated by the fact that many existing hardware architectures are designed specifically for sequential processing of color planes, one at a time. In one exemplary method, a CMY image can be separated into three color planes C, NM and Y; each of which goes through a XM2 compression. The compressed planes can then be spooled in preparation for submission to a print queue, or are archived for possible future reprinting. Immediately prior to printing, the compressed files are retrieved, decompressed, and processed through the (currently) 1-D calibration transform one color plane at a time.

Figure 3:
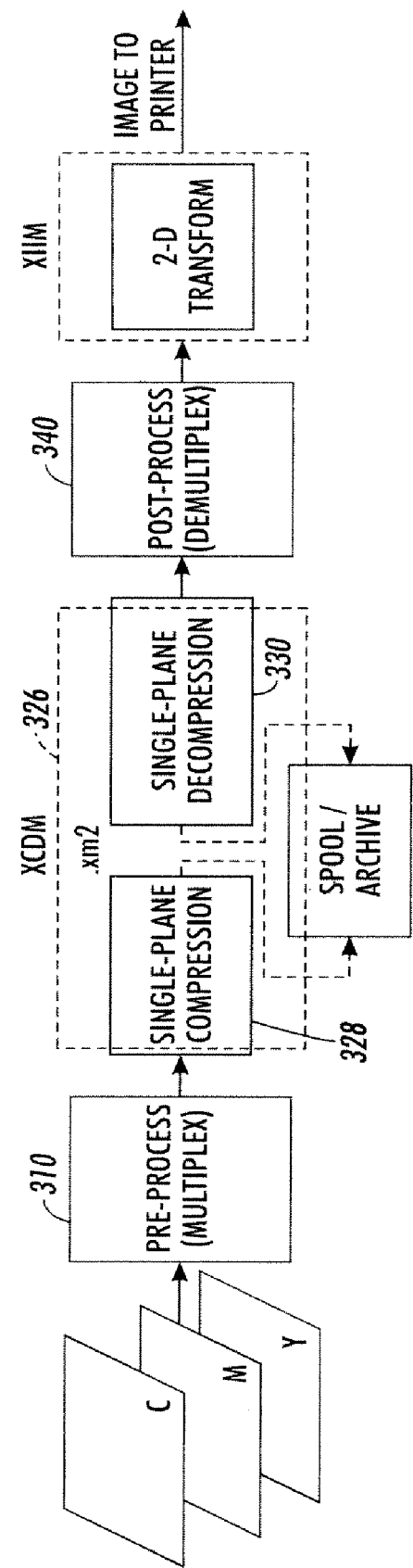
FIG. 3 illustrates an exemplary two-dimensional calibration transformation system for processing one color plane, which can be implemented in accordance with an embodiment of the present disclosure.
Figure 4:
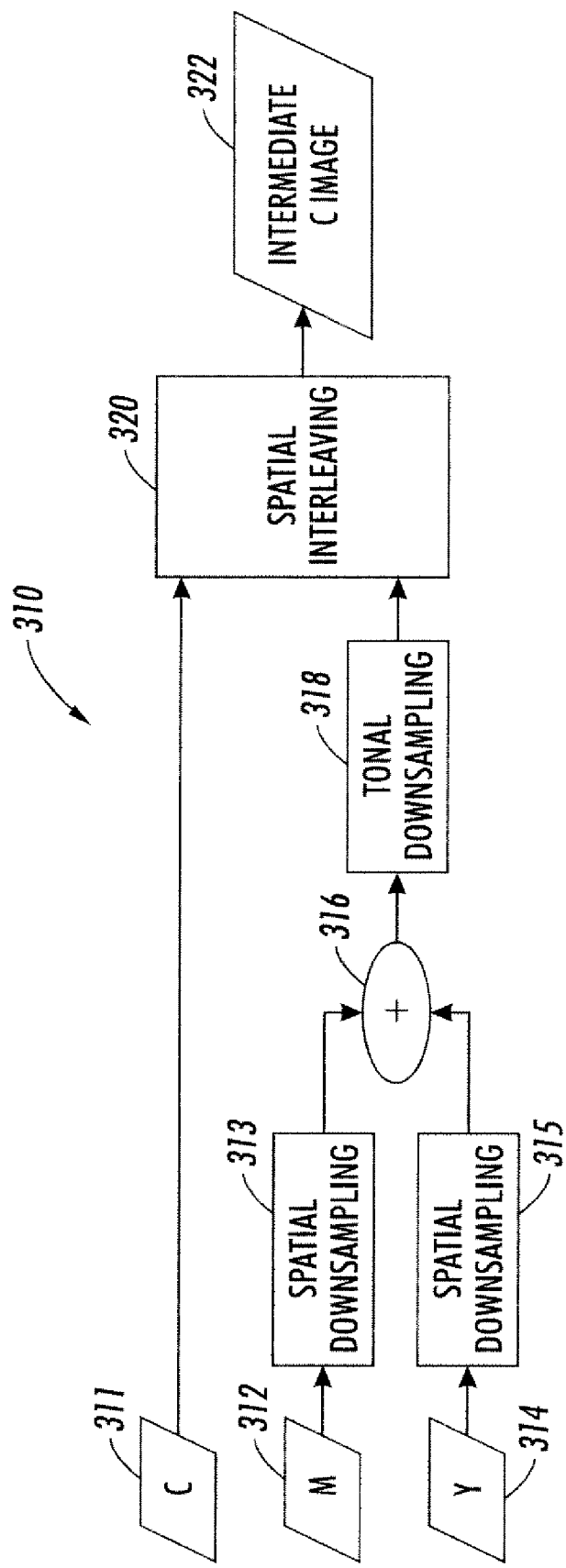
FIG. 4 details the pre-processing (multiplex) step for one of the color planes according to FIG. 3.
Figure 5:
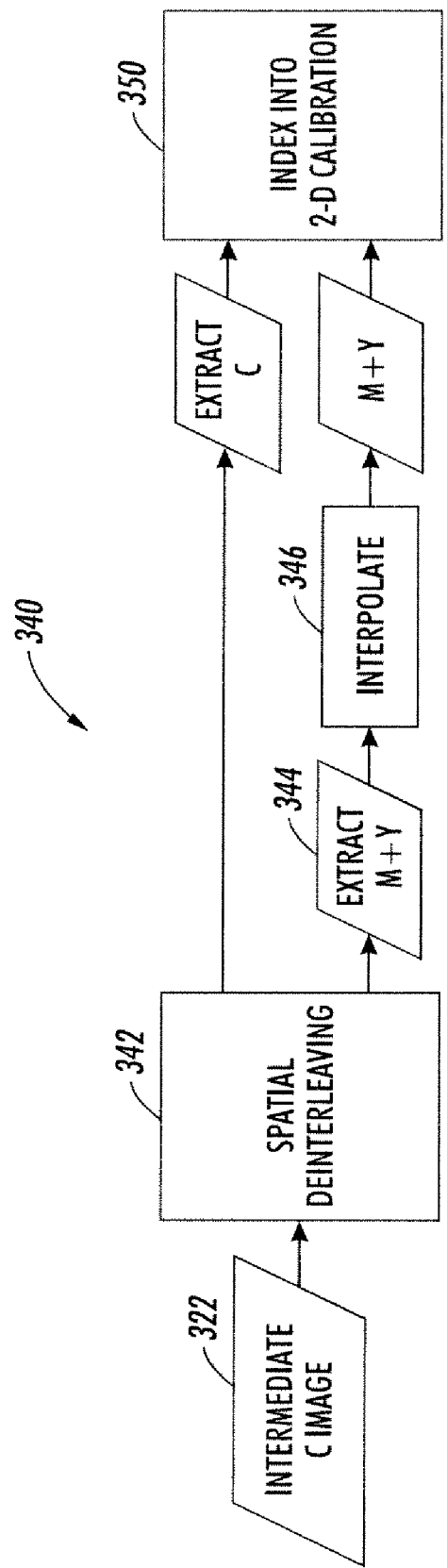
FIG. 5 details the post-processing (demultiplex) step for one of the color planes according to FIG. 3.

One embodiment for realizing 2-D transforms within a 1-D image processing hardware architecture is shown in FIG. 3. FIGS. 4 and 5, respectively, show exemplary realizations of the pre-processing 310 and post-processing blocks 340 of FIG. 3 for the exemplary Cyan channel 311. The pre-processing step 310, as illustrated in FIG. 4, first spatially downsamples 313, 315 the M 312 and Y 314 images, and then obtains an M+Y image 316 by simply performing a pixel-wise addition of the corresponding M and Y (M+Y) values 316. Next, the M+Y image 316 can be tonally downsampled 318 to further help meet bandwidth and/or memory constraints. The C 311 and downsampled M+Y images 318 are then interleaved 320 to create an intermediate image 322 which is supplied to the compression module 326. Standard (e.g. XM2) compression 328 can be applied to this image. Prior to printing, the interleaved image is expanded by the de-compression module 330. Finally, de-interleaving 342 followed by interpolation 346 on the M+Y image 344 are used to recover the color variables in order to index into the 2-D calibration LUT 350.

Figure 2:
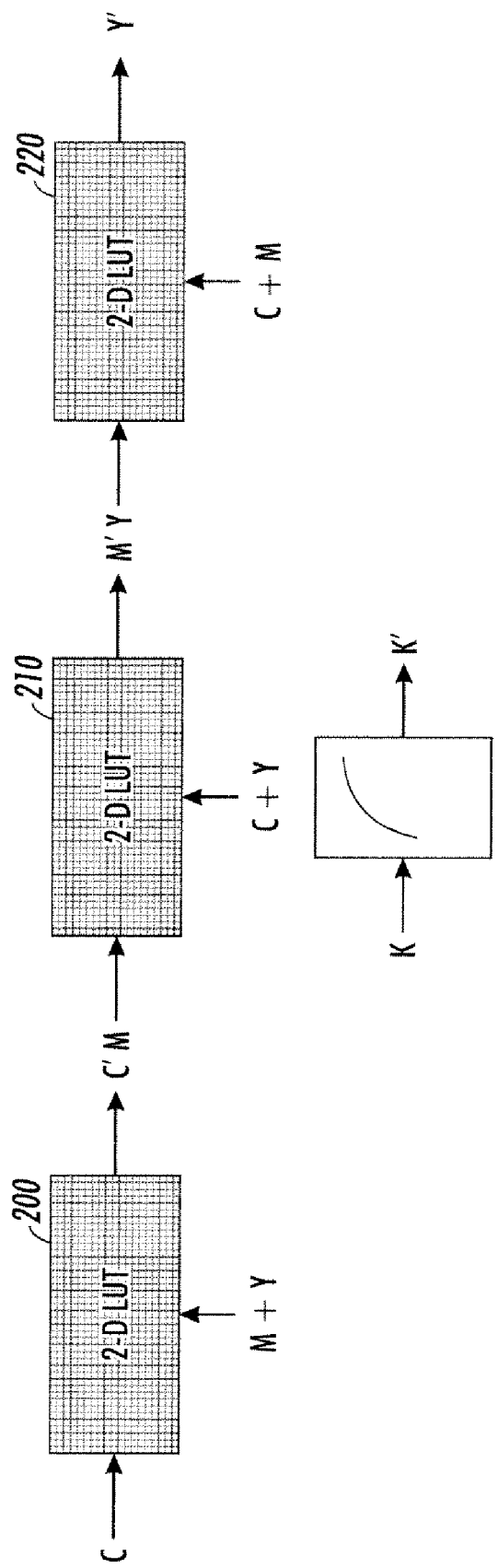
FIG. 2 illustrates a three-color two-dimensional calibration transformation system.
Figure 6:
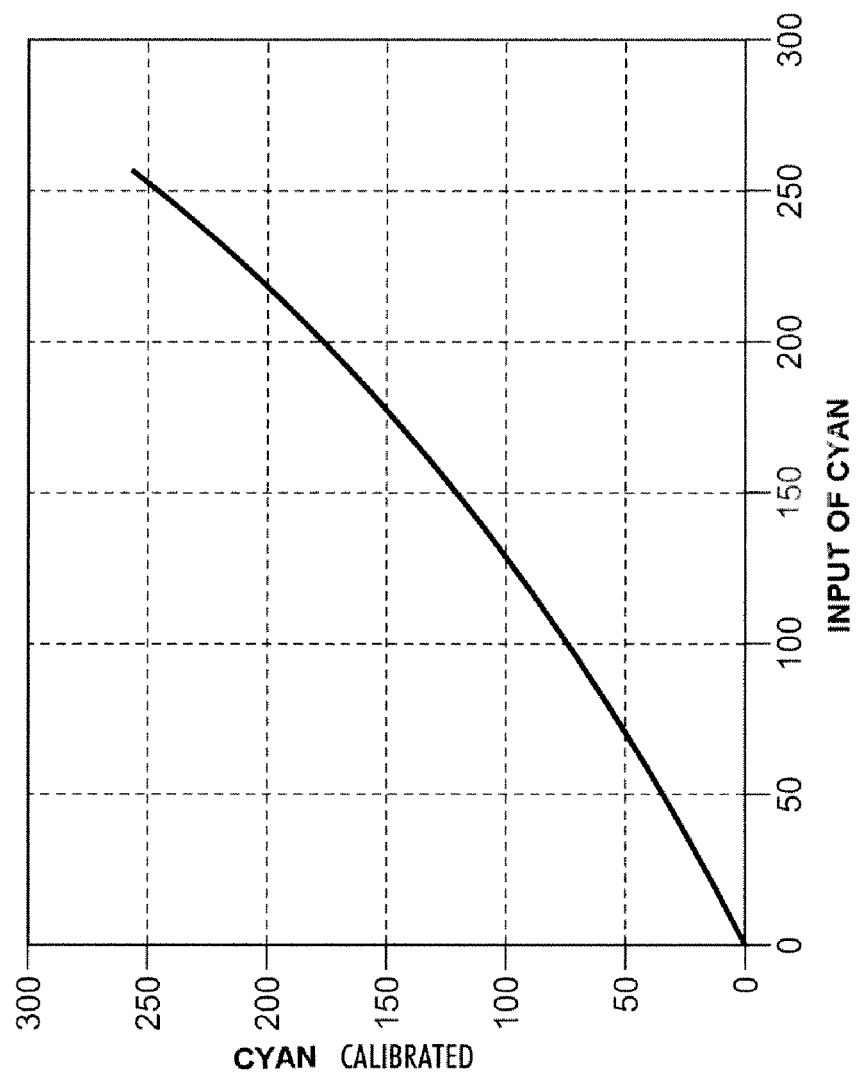
FIG. 6 plots an actual 2-D calibration transform derived for a color laser printer displaying the calibrated cyan value as a function of input of cyan.
Figure 7:
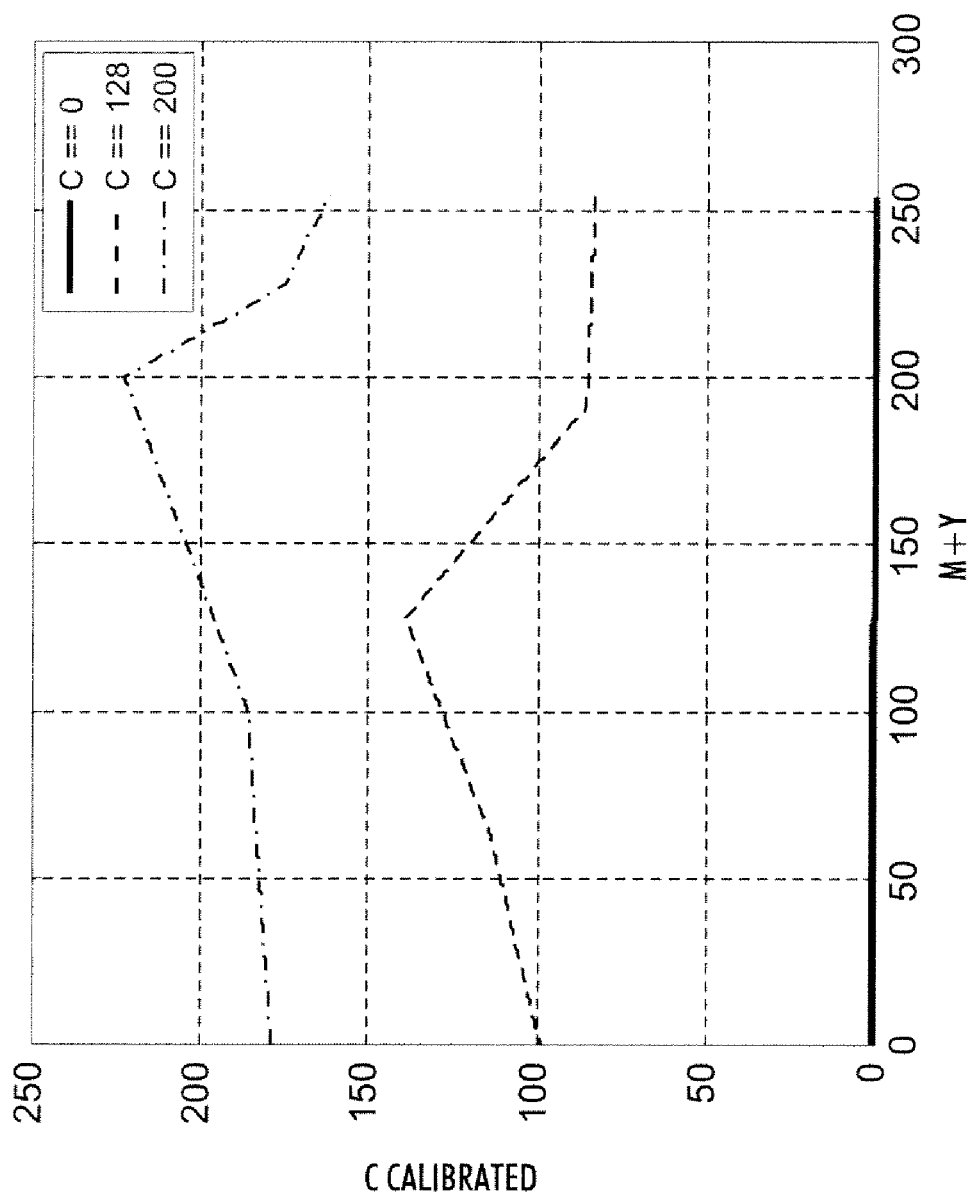
FIG. 7 plots an actual 2-D calibration transform derived for a color laser printer displaying the calibrated cyan value as a function of input of magenta and yellow.

Note that to completely retain the capability to perform a 2-D transform as in FIG. 2, the C and M+Y separations can be combined without any loss of information. System bandwidth and memory constraints however mandate that some loss is inevitable. One transformation includes spatially downsampling the M+Y channel while completely retaining the Cyan channel. This is justified by the insight that the 2-D calibration transform for Cyan has a primary dependence on the Cyan channel and only a weak second order dependence on the M+Y variable. FIGS. 6 and 7 show plots from an actual 2-D calibration transform derived for a color laser printer to verify this intuition. Namely, FIG. 6 plots an actual 2-D calibration transform derived for a color laser printer displaying the calibrated cyan value as a function of input of cyan. FIG. 7 plots an actual 2-D calibration transform derived for a color laser printer displaying the calibrated cyan value as a function of input of magenta and yellow. FIGS. 6 and 7 illustrate that the primary dependence of the calibration transform for a given color channel is on the input digital value corresponding to that channel. As an example, the calibrated cyan value is plotted as a function of input C in (FIG. 6) and M+Y in (FIG. 7).

The choice of spatial interleaving is again a function of system constraints. If bandwidth (e.g. size of XM2 files after compression) is the primary constraint, then a block interleave strategy should be used. A simple way to achieve this would be to combine a block of Cyan values from the C image with a block of M+Y values from the M+Y image. This however, comes at the cost of a more complicated de-interleaving hardware in the post-processing step which would require a buffer to obtain corresponding C and M+Y values to index into the 2-D calibration LUT. A pixel interleaving strategy could be used to avert this but that is likely to adversely affect the compressibility of the intermediate image file. A trade-off may be achieved by appropriately choosing the block size (a block size of one reduces to pixel interleave).

Tonal downsampling (or quantization) of the secondary signals can also be performed to further reduce storage and memory requirements. For 2-D calibration, with 8-bit input images, the secondary signals (i.e. M+Y, C+Y, and C+M) would each require 9 bits. Experiments indicate that dropping the lowest bit does not produce any noticeable effect on image quality.

Figure 8:
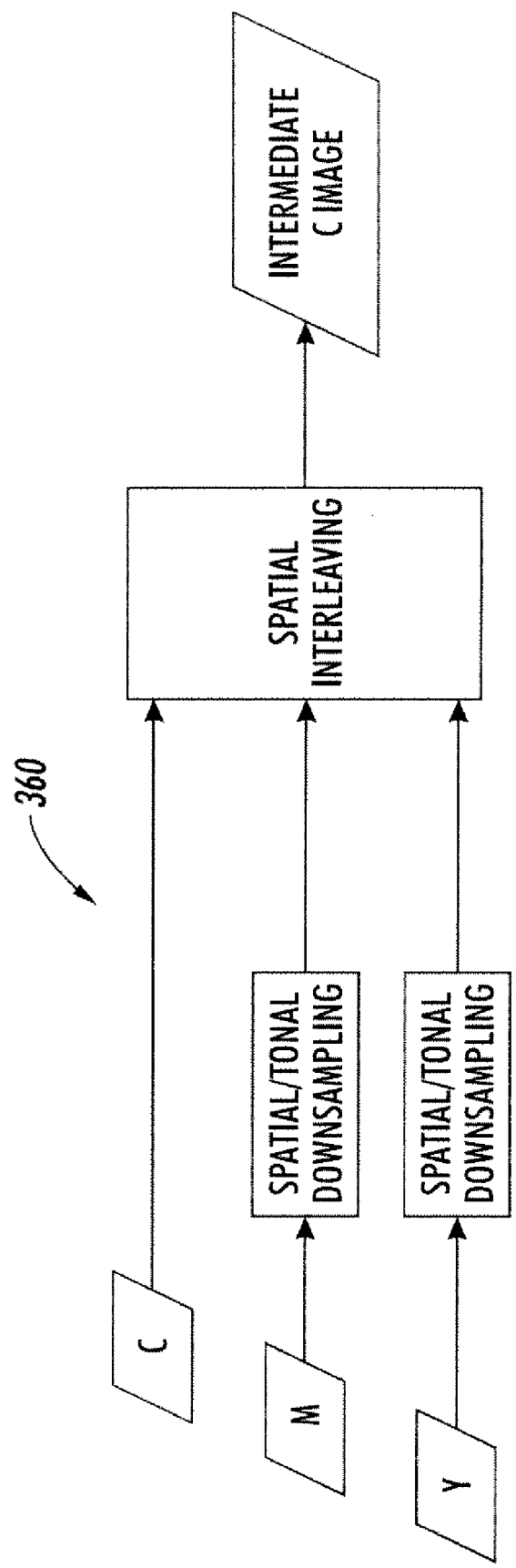
FIG. 8 illustrates an exemplary three-dimensional calibration transformation system and a pre-processing step for processing one of the color planes, which can be implemented in accordance with another embodiment of the present disclosure; and, FIG. 9 details the post-processing (demultiplex) step for one of the color planes according to FIG. 8.
Figure 9:
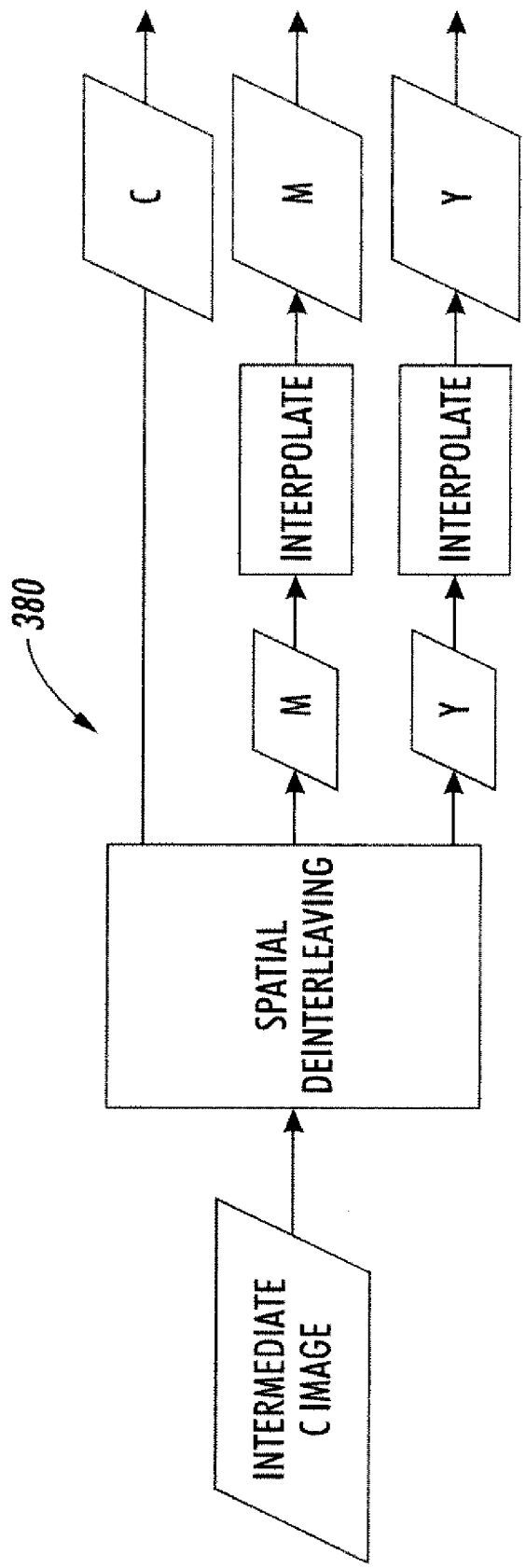

A second embodiment that realizes a three-dimensional (3-D) calibration transform is presented on similar principles and will be described below. The 3-D calibration transform can be realized within the same single-plane processing framework. As with the previous embodiment, a pre-processing 360 and post-processing 380 modules are introduced in the image path before the XM2 compression and after decompression, respectively, refer to FIGS. 8 and 9.

In this embodiment, the calibration transform would be implemented by a 3-D LUT. The scheme follows the same principles as in the first embodiment. As an example, for the Cyan calibration transform, three images—full resolution Cyan, and downsampled M and Y respectively are interleaved into a single image. The downsampling procedure (or factor) for M and Y can be chosen differently to capture certain interactions with C which are more critical. The interleaved images are compressed using standard techniques. Upon decompression, the images are de-interleaved and indexed into the respective 3-D calibration LUTs.

It is to be appreciated that the disclosure proposes a method for realizing multi-dimensional transforms in a sequential 1-D architecture. As evident in FIGS. 3-9, the spatial and downsampling steps can introduce some distortion, and the realized transforms can serve as an approximation to the true multi-dimensional transform.

Results for renditions of two CMYK images through: i) a full-resolution 2-D calibration and ii) the proposed realization in this disclosure were compared. In particular, the spatial downsampling employed was by a factor of two (2) in both the horizontal and vertical directions, while the tonal downsampling was achieved by rounding off the 9 bit M+Y values to 8 bits, (where the individual M, Y separations are each allocated 8 bits). Therefore the intermediate interleaved image created for 2-D calibration of the cyan separation is only 25% larger than the original input cyan separation (likewise for the other planes). As described above, pre-processing and post-processing steps (FIGS. 4 and 5) can incur some additional processing—however, since this is accomplished in hardware, the impact on overall throughput is minimal.

Images processed through the full-resolution vs. the proposed realization of the 2-D transform are virtually indistinguishable in terms of image appearance.

It will be appreciated that many of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing a color image, comprising:
   receiving a plurality of device color separations for an image intended for rendering on a color image device,
   forming at least one intermediate image by interleaving pixels from at least two of the device color separations;
   compressing the said at least one intermediate image in a compression module;
   decompressing the said at least one intermediate image in a decompression module;
   processing the said at least one decompressed intermediate image through a multidimensional calibration transform to output a calibrated device color separation; and,
   said device color separations include at least three colors.

2. The method of claim 1, wherein,
   said device color separations include a first, second, and third color;
   a first intermediate image is formed by interleaving said first color, treated as the primary component, with functions of said second and said third colors, treated as a first secondary component;
   a second intermediate image is formed by interleaving said second color, treated as the primary component, with functions of said first and said third colors, treated as a second secondary component;
   a third intermediate image is formed by interleaving said third color, treated as the primary component, with functions of said first and said second colors, treated as a third secondary component; and,
   said processing maps each intermediate image through said multidimensional calibration transform and outputs a calibrated separation corresponding to the primary component of each respective said intermediate image.

3. The method of claim 2, wherein,
   for said first intermediate image, said first secondary component is formed as the sum of said second and third colors;
   for said second intermediate image, said second secondary component is formed as the sum of said first and third colors; and,
   for the third intermediate image, said third secondary component is formed as the sum of said first and said second colors.

4. The method of claim 3, wherein,
   said processing maps each intermediate image through a two-dimensional calibration transform and outputs a calibrated separation corresponding to said primary component of the associated said intermediate image, where the two dimensions of the calibration transform are respectively the primary and secondary components of the corresponding intermediate image.

5. The method of claim 4, wherein,
   said first, second, and third secondary components of each said first, second, and third intermediate images is calculated at a reduced spatial resolution.

6. The method of claim 5, wherein,
   said processing upsamples the secondary component of each intermediate image at full spatial resolution prior to mapping through the calibration transform.

7. The method of claim 6, wherein,
   said upsampling involves interpolation among known pixel values to obtain missing pixel values.

8. The method of claim 7, wherein,
   said secondary component of each said intermediate image is tonally quantized to a smaller number of bits.

9. A method for processing a color image for a color imaging device, comprising:
   receiving a plurality of device color separations for an image intended for rendering on a color image device,
   said device color separations include a first, second, and third color;
   forming at least one intermediate image by interleaving pixels from at least two of the device color separations, wherein said at least one intermediate image is formed by interleaving said first color, treated as the primary component, with functions of said second and said third colors, treated as a first secondary component;
   compressing the said at least one intermediate image in a compression module;
   decompressing the said at least one intermediate image in a decompression module; and,
   processing the said at least one decompressed intermediate image through a multidimensional calibration transform to output a calibrated device color separation.

10. The method of claim 9, further comprising:
    forming at least a second intermediate image by interleaving pixels from at least two of the device color separations, wherein said at least second intermediate image is formed by interleaving said second color, treated as the primary component, with functions of said first and said third colors, treated as a second secondary component;
    compressing the said at least second intermediate image in a compression module;
    decompressing the said at least second intermediate image in a decompression module; and,
    processing the said at least second decompressed intermediate image through a multidimensional calibration transform to output a calibrated device color separation.

11. The method of claim 10, further comprising:
    forming at least a third intermediate image by interleaving pixels from at least two of the device color separations, wherein said at least third intermediate image is formed by interleaving said third color, treated as the primary component, with functions of said first and said second colors, treated as a third secondary component;
    compressing the said at least third intermediate image in a compression module;
    decompressing the said at least third intermediate image in a decompression module; and,
    processing the said at least third decompressed intermediate image through a multidimensional calibration transform to output a calibrated device color separation.

12. The method of claim 11 further comprising:
    for said first intermediate image, said first secondary component is formed as the sum of said second and third colors;
    for said second intermediate image, said second secondary component is formed as the sum of said first and third colors; and,
    for the third intermediate image, said third secondary component is formed as the sum of said first and said second colors.

13. The method of claim 12, wherein, said processing maps each intermediate image through a two-dimensional calibration transform and outputs a calibrated separation corresponding to said primary component of the associated said intermediate image, where the two dimensions of the calibration transform are respectively the primary and secondary components of the corresponding intermediate image.

14. The method of claim 13, wherein, said first, second, and third secondary components of each said first, second, and third intermediate images is calculated at a reduced spatial resolution.

15. The method of claim 14, wherein, said processing upsamples the secondary component of each intermediate image at full spatial resolution prior to mapping through the calibration transform.

16. The method of claim 15, wherein, said upsampling involves interpolation among known pixel values to obtain missing pixel values.

17. The method of claim 16, wherein, said secondary component of each said intermediate image is tonally quantized to a smaller number of bits.

18. A method for processing a color image comprising:

receiving a plurality of device color separations for an image intended for rendering on a color image device, forming at least one intermediate image by interleaving pixels from at least two of the device color separations;

compressing the said at least one intermediate image in a compression module;

decompressing the said at least one intermediate image in a decompression module;

processing the said at least one decompressed intermediate image through a multidimensional calibration transform to output a calibrated device color separation;

said device color separations include a first, second, and third color;

forming a first intermediate image by interleaving said first color, treated as the primary component, with a sum of said second and said third colors, treated as a first secondary component;

forming a second intermediate image by interleaving said second color, treated as the primary component, with a sum of said first and said third colors, treated as a second secondary component; and, forming a third intermediate image by interleaving said third color, treated as the primary component, with a sum of said first and said second colors, treated as a third secondary component.

19. The method of claim 18, wherein, said processing maps each intermediate image through said multidimensional calibration transform and outputs a calibrated separation corresponding to the primary component of each respective said intermediate image.

20. The method of claim 19, wherein, said first, second, and third secondary components of each said first, second, and third intermediate images is calculated at a reduced spatial resolution;

said processing upsamples the secondary component of each intermediate image at full spatial resolution prior to mapping through the calibration transform; and, said upsampling involves interpolation among known pixel values to obtain missing pixel values.

21. The method of claim 18, wherein,

Said first color, said second color, and said third color are each selected from the group consisting of cyan, magenta, and yellow.

* * * * *